Sept. 11, 1934.  J. E. HILBERT  1,973,208
METHOD AND MEANS FOR CUTTING AND WRAPPING HONEY
Filed July 29, 1932   3 Sheets-Sheet 1
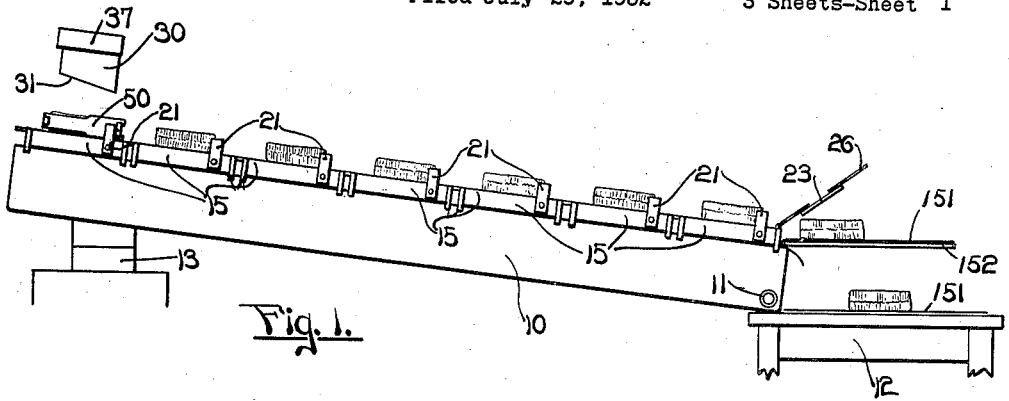
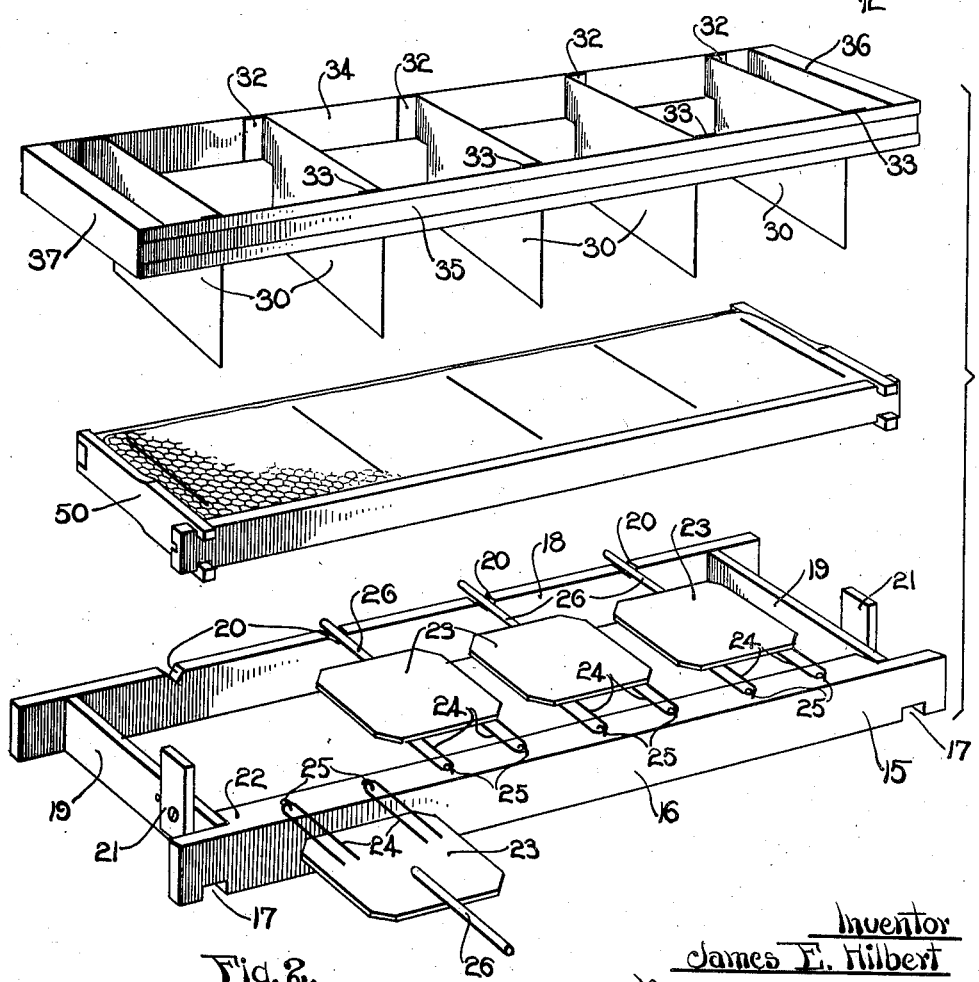

Sept. 11, 1934.  J. E. HILBERT  1,973,208
METHOD AND MEANS FOR CUTTING AND WRAPPING HONEY
Filed July 29, 1932  3 Sheets-Sheet 2
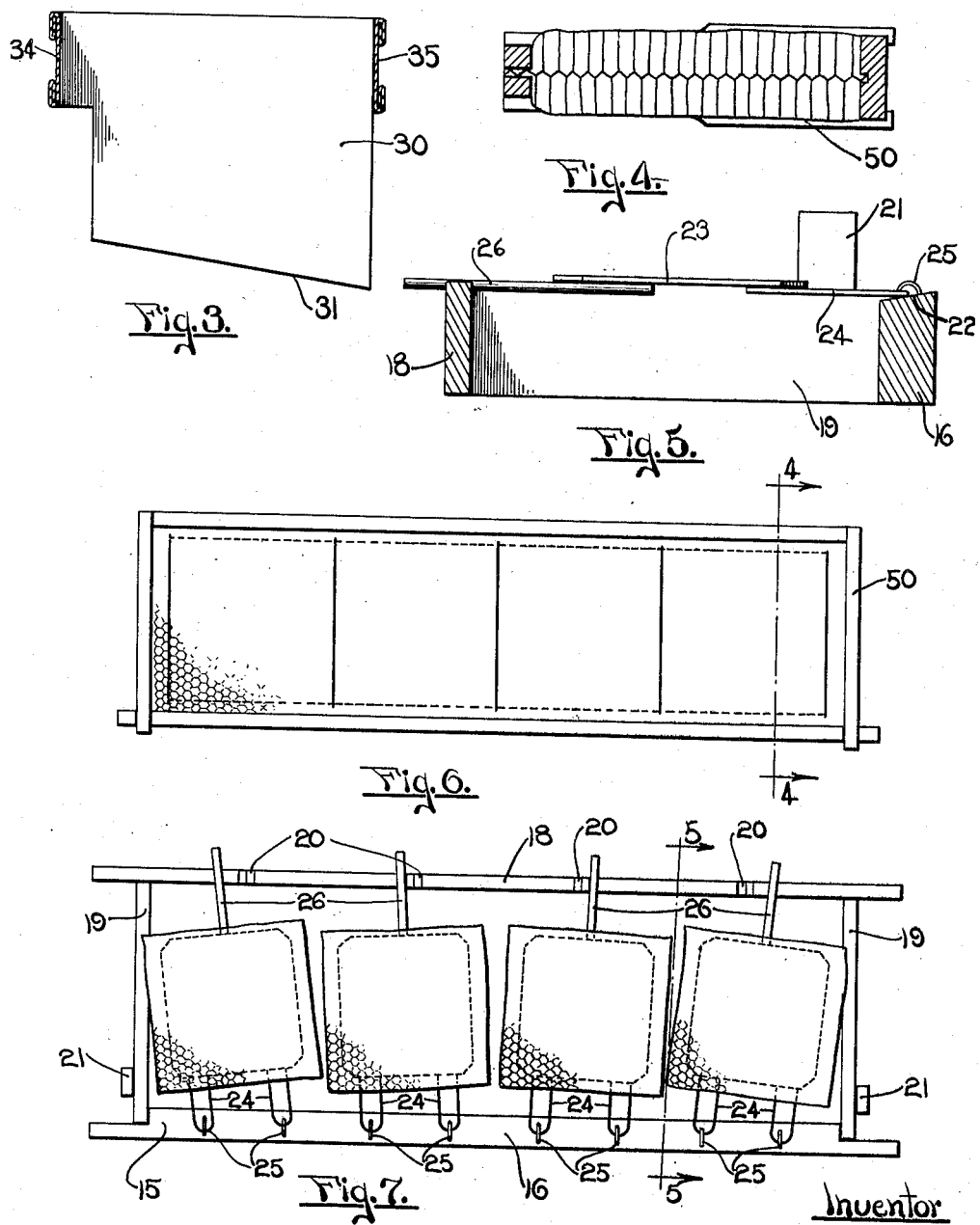

Sept. 11, 1934.  J. E. HILBERT  1,973,208

METHOD AND MEANS FOR CUTTING AND WRAPPING HONEY

Filed July 29, 1932   3 Sheets-Sheet 3

Inventor
James E. Hilbert
By Liverance &
San Antonio
Attorneys

Patented Sept. 11, 1934

1,973,208

UNITED STATES PATENT OFFICE 1,973,208

METHOD AND MEANS FOR CUTTING AND WRAPPING HONEY

James E. Hilbert, Traverse City, Mich.

Application July 29, 1932, Serial No. 625,630

9 Claims. (Cl. 6—12)

This invention pertains generally to the cutting and wrapping of a sticky or semifluid substance and more particularly relates to the cutting and wrapping of comb honey.

In the past considerable difficulty has been experienced in the cutting and the wrapping of honey due to its inherent qualities and it is the purpose of the present invention to overcome these difficulties as well as obtain certain advantages which will be apparent as the description proceeds.

Briefly described, my invention consists of means for cutting the honey while it is still in the frame in which it is produced and then shifting the honey onto a plurality of supporting paddles, these paddles being movable relatively to one another whereby the cut edges are free and spaced apart from each other whereby proper drainage is had therebetween. Next, each of the individual cut pieces of honey is movable onto a cellophane wrapper suitably supported upon a flat surface.

Thus it will be seen that the honey is not only quickly and expediently cut and wrapped but also little handling thereof is needed. Furthermore, the honey is properly drained and hence a neater looking package is attainable as no free honey flows onto the cellophane wrapper.

Other objects, advantages and meritorious qualities reside in the special construction, combination and arrangement of the various elements forming the invention as more fully hereinafter described and claimed, reference being had to the accompanying drawings forming part hereof, wherein:

Fig. 1 is a side view of my invention.

Fig. 2 is a perspective view disclosing the draining frame, the comb of honey and the cutting knife.

Fig. 3 is a sectional view taken through the cutting knife.

Fig. 4 is a view through the wooden frame containing the comb honey, this view being taken along the line 4—4 of Fig. 6.

Fig. 5 is a view taken along the line 5—5 of Fig. 7.

Fig. 6 is a plan view of the honey frame showing the slits made by the cutting knife.

Fig. 7 is a plan view showing the several pieces of comb honey in separated position whereby the draining thereof is had.

Similar numbers refer to similar parts throughout the several views.

Figure 8:
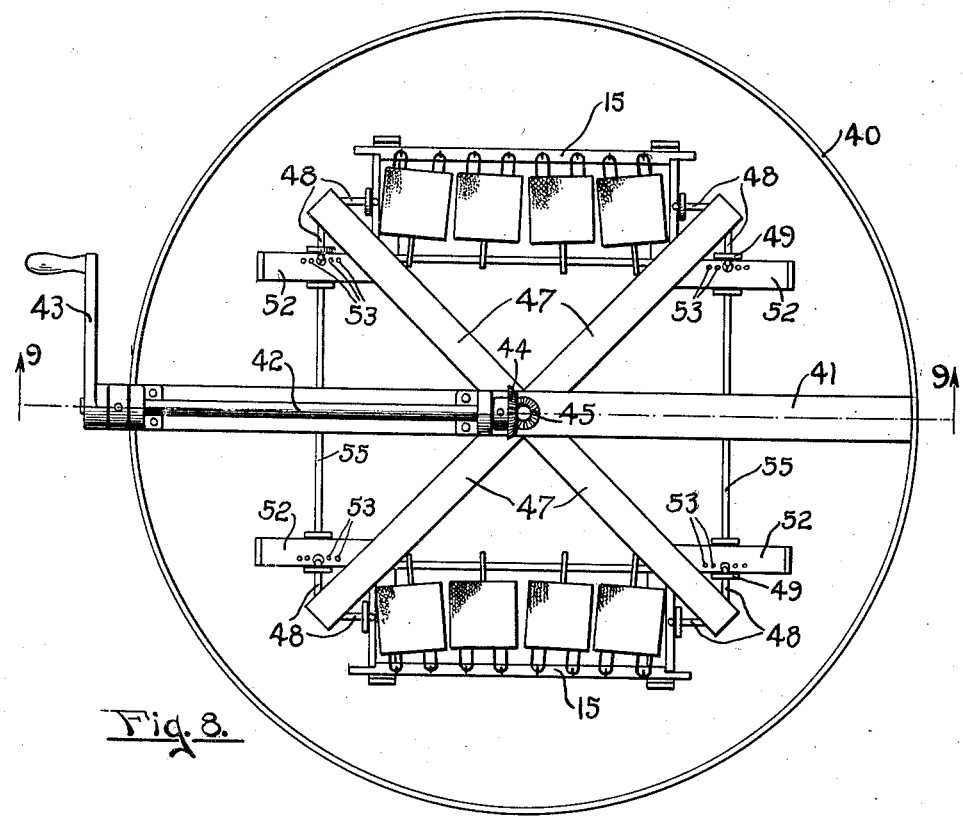
Fig. 8 is a plan view of my centrifugal means whereby the free honey is quickly thrown from the blocks of the comb honey.

Referring to Fig. 1, numeral 10 indicates a draining pan, having an outlet 11, which is supported at one edge upon the table 12 and which has its other edge adjustably supported as indicated at 13. Thus, the free honey which drips into the pan will flow downwardly toward its lower edge whereby it may be readily removed therefrom.

A series of frames, designated generally by the reference numeral 15, see Fig. 1, are similarly formed as will now be described.

Each frame consists of a relatively heavy side member 16, slotted as indicated at 17 whereby the edges of the draining pan 10 may ride therein and thus permit the frame to be slidably mounted thereon, is attached to a thinner member 18 by means of the side members 19, such being clearly shown in Figs. 2 and 7. The member 18 is notched as indicated at 20. The end members 19 are provided with vertical stop members 21 which serve to position the honey carrying frame 50, shown in Fig. 1.

The member 16, see Fig. 5, is beveled inwardly as indicated at 22 and hence any honey which drips or is spilled thereon will drain or drip inwardly and downwardly along the inner side of the member 16 and then drip into the draining pan.

Paddles or supporting means 23 are formed of solid or perforated material and have spaced loop members 24 rigidly extending from one edge thereof, these loops being threaded through staples 25, see Figs. 2 and 7, whereby a loose pivotal connection is formed, such permitting both tilted and sidewise movement of each of the paddles. A handle member 26 extends from the opposite side of each of the paddles and rests in the respective groove 20 as is clearly shown in Fig. 2. However, after the honey has been placed upon the paddles, they are shifted to the position, as shown in Fig. 7, whereby their edges will be spaced from one another and hence the free honey may drain downwardly therefrom. It will be noted that the paddles are of smaller size than the chunks of honey whereby the free honey will not drip thereupon.

Referring now to the upper portion of Fig. 2, 30 indicates a cutting plate, this plate being tapered as indicated at 31, see Figs. 1 and 3, and having lips 32 and 33 at its upper rear edge portions. The lips 32 are welded to a rear member or strip 34 and the other lips 33 are attached rigidly to the front member 35, whereby the several cutting knives 30 are held in spaced parallel relationship. The supporting strips 34 and 35 extend slightly beyond the end cutting knives 30 whereby handles 36 and 37 may be fastened therebetween. This is clearly shown in Fig. 2.

Figure 9:
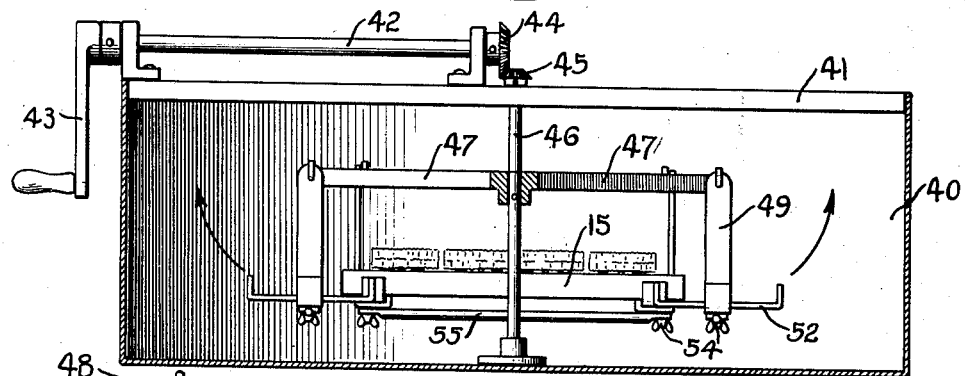
Fig. 9 is a sectional view taken along the line 9—9 of Fig. 8.

Referring now to Figs. 8, 9 and 10, 40 designates a tank having a cross member 41 upon which is rotatably mounted a shaft having a crank 43 at its outer end and a bevel gear 44 at its inner end, this bevel gear 44 meshing with a bevel pinion 45 fixed to the vertical rotatable shaft 46 as is clearly shown in either Figs. 8 or 9.

The vertical shaft 46 is rotatable by means of the crank 43 and rigidly carries a frame having arms 47 extending radially therefrom, these arms being equally spaced circumferentially and carrying pivoted brackets at their respective ends.

Figure 10:
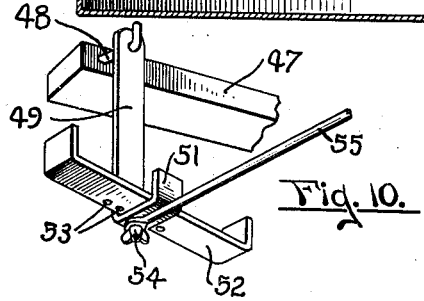
Fig. 10 is a perspective view of one of the pivoted supporting means for the frames which carry the several cakes of honey.

That is, referring to Fig. 10, each radial arm 47 has a rod 48 extending horizontally therefrom, a depending bracket member 49 being pivotally mounted thereon. The bracket member 49 has its lower end channel-shaped as shown at 51 and the cross member 52, having several openings 53, is adjusably mounted in said channel shaped portion by means of the bolt 54. A rod 55, see Fig. 9, extends between the sets of brackets 49 and prevents their circumferential separation. The openings or holes 52 permit the adjustment of the member 52 whereby the frame 15 may be located with its center of gravity along the vertical axis of the bracket member 49 and thus the several chunks of honey resting upon the frame 15 will be horizontally located when placed upon their several supporting means.

As shown in Fig. 8, only two frames 15 are positioned upon the rotating mechanism but it is obvious that the other frames may be positioned as desired.

*The operation* will now be set forth. The person utilizing the device, places one of the draining frames 15 upon the draining pan 10, the notches 17 being slidably received on the edges of the pan. Next, the frame 50, such containing the honey which is to be cut is placed upon the frame 15, the vertical stop members 21, such being adjustable, accurately locate the honey frame with respect to the paddles 23. The paddles 23 have their handle members 26 resting in the notches 20. See Fig. 2. Next, the operator grasps the cutting instrument and presses it downwardly from the position as indicated in Fig. 1, the taper 31 of the several cutting knives 30 causing the honey frame 50 to bear firmly against the vertical stops 21 and then passing downwardly between the several supporting paddle members 23. This operation cuts the honey in a number of parallel slits as is shown by the heavy full lines in Figs. 2 and 6. It will be seen that the honey is firmly attached to the sides of the frame 50 during this cutting operation and hence no difficulty will be had in inserting or withdrawing the parallel knives 30.

Next, the honey is manually cut along the dotted lines as shown in Fig. 6 and this finishes the cutting operation whereupon the chunks of honey become entirely supported by means of the paddles 23, the outer frame 50 being moved.

The operator now moves the paddles 23 by grasping the handle members 26 to the position shown in Fig. 7, such being permitted by reason of the loose hinged connection previously set forth. Now as already described, the honey is free to drain and this usually takes fifteen or twenty minutes.

If desired, the frames 15 may be placed in the centrifugal machine previously referred to and the same rotated by turning the crank 43 thus causing the bracket members 49 to swing outwardly to a substantially horizontal position as indicated by the arrows of Fig. 9. When in this position, centrifugal force is exerted upon the free honey which surrounds each of the several cut blocks of honey with the result that the same flies outwardly and after a minute or so all of the surplus free honey is removed from the several blocks of honey and they are now ready to be wrapped. It is to be noted that centrifugal force maintains the several pieces of honey firmly upon the several supporting paddles and that the free honey is not hindered in its separating movement as the paddles are somewhat smaller than the individual blocks of honey. In other words, due to the pivotal supporting means, I utilize gravity to maintain the blocks of honey in position when the machine is at rest and centrifugal force for the same purpose when the machine is in motion. The effect of the centrifugal force is great enough so that no manual separation of the blocks of honey needs be made in many cases and this is another advantage as it eliminates one of the steps in the process of wrapping honey.

The above centrifugal unit for separating the free honey is advisable whenever a considerable amount of honey is being worked, but in the smaller apiaries, it is oftentimes economical to utilize the gravity mtehod of draining the honey. The next step in the gravity method, previously referred to, is for the operator to slide the frame 15 along the pan 10 and then repeat the operations as many times as desired. The pieces of honey are removed from the lower end of the pan, the same being accomplished by inverting each paddle upon a sheet of cellophane 151 supported by a member 152 which is manually held against the member 16 of the draining frame 15 and supported upon the lower edge of the pan 10 and thus an exact and correct positioning of the honey cake and its wrapper is had.

It will also be seen that the cutting knives may be spaced to give the desired size of cake of honey and also, especially with these smaller size of cakes, it is within the purview of my invention to remove the cakes, after draining, by simply lifting them from the respective paddles as by means of tongs or the like.

Also, the smaller sized cakes of honey may be removed before draining and placed upon a wire tray or screen, properly mounted on the pivoted membes 49, thus giving quick drying, the free honey gravitating downwardly before the machine is in motion through the meshes of the supporting means and then being expelled radially, also through said meshes, after proper rotative speed is had.

Although a particular embodiment of the invention has been illustrated and described in order to comply with the terms of the patent statutes, it is not intended that the invention shall be limited to said particular embodiment since the invention may be applied to other forms without departing from its spirit.

I claim:

1. In combination, a draining reservoir, a frame slidably mounted over said reservoir, a plurality of paddles, each paddle being adapted to support a block of honey for the purpose described, and means for mounting the several paddles upon the frame whereby they may be pivoted with respect thereto and also shifted laterally about their pivotal axes.

2. In combination, a frame, a plurality of supporting elements having flat upper surfaces, and means to movably mount said elements upon said frame whereby they may be shifted laterally for the purpose described.

3. In combination, a frame of the type described, a plurality of paddles, and means for mounting said paddles upon said frame, said mounting means permitting the paddles to be swung about axes and also permitting them to be shifted laterally therefrom.

4. A draining frame of the class described comprising two side members and two end members fastened together in rigid relationship whereby a rectangular frame is formed, a plurality of paddles, means for pivotally mounting one end of each of the several paddles upon one of the said side members, the other ends of the several paddles resting upon the other side member.

5. A draining frame of the class described, having a relatively large opening therethrough, and a series of paddles pivoted to the draining frame and extending over said opening therein and being supported at their free ends upon the said draining frame, said draining frame having its portion to which the said paddles are pivoted sloped inwardly toward said opening whereby any fluid which is spilled thereon will drain toward said opening.

6. A draining frame for supporting cut blocks of honey having an opening therethrough, a plurality of paddles, and means for supporting the paddles in operative relationship with the said frame, said means including a loose pivoted connection between one end of each of the several paddles and the frame.

7. The process of cutting and wrapping honey which consists in supporting a relatively large portion of honey, then cutting the honey to predetermined sizes, then slightly separating the several pieces of honey, placing the same in an inclined position whereby the drainage thereof is had, and then removing the several blocks of honey individually whereby the same may be wrapped in any desired manner.

8. The process of preparing honey which consists in supporting a relatively large portion of honey, then separating said relatively large portion of honey into two or more pieces, then subjecting each piece of honey to the action of centrifugal force whereby the free honey is separated therefrom, and then individually wrapping each of the pieces of honey.

9. The process of cutting and draining honey which consists in supporting a relatively large block of comb honey, then separating the honey, then moving the pieces of honey apart from each other whereby the honey is held in separated relationship, and then simultaneously subjecting the honey to the action of centrifugal force for the purpose described.

JAMES E. HILBERT.